United States Patent [19]

Kelley

[11] 4,118,144

[45] Oct. 3, 1978

[54] SUPPORT MEANS FOR A WINDMILL

[76] Inventor: Lawrence L. Kelley, 526 Lincoln Ave., Titusville, Fla. 32780

[21] Appl. No.: 677,812

[22] Filed: Apr. 16, 1976

[51] Int. Cl.² .................. F01D 7/00; F03D 1/04; F03D 7/04; F03D 11/04

[52] U.S. Cl. .................. 416/41; 416/121; 416/135; 416/194; 416/198 A

[58] Field of Search ............... 415/2, 3, 4, 141; 416/117, 118, 119, 41, 135, 141, 201 A, 201, 200 A, 200, 198 A, 198, 199, 120, 121, 194, 176

[56] References Cited

U.S. PATENT DOCUMENTS

| | | | |
|---|---|---|---|
| 27,951 | 12/1860 | Fletcher | 415/2 UX |
| 188,139 | 3/1877 | Howland et al. | 416/117 |
| 624,761 | 5/1899 | Dingman | 416/176 X |
| 1,298,247 | 3/1919 | Muller | 415/2 |
| 1,321,415 | 11/1919 | Brown | 416/118 |
| 1,333,987 | 3/1920 | McManigal | 415/4 |
| 1,374,659 | 3/1921 | Holmes et al. | 416/41 |
| 1,502,433 | 7/1924 | Johanson | 415/4 |
| 1,503,061 | 7/1924 | Pendergast | 415/2 X |
| 1,915,689 | 6/1933 | Moore | 416/117 |
| 1,936,233 | 11/1933 | Groves | 415/4 |

FOREIGN PATENT DOCUMENTS

| | | | |
|---|---|---|---|
| 326,765 | 6/1903 | France | 415/2 |
| 553,834 | 5/1923 | France | 416/194 |
| 909,378 | 5/1946 | France | 416/41 |
| 997,942 | 1/1952 | France | 415/3 |
| 1,038,090 | 9/1953 | France | 415/141 |

*Primary Examiner*—Carlton R. Croyle
*Assistant Examiner*—Donald S. Holland
*Attorney, Agent, or Firm*—Wayne A. Sivertson

[57] ABSTRACT

Apparatus for deriving a rotational motion from air currents including first and second coaxial annular members spaced from each other along their axes by axial struts and a plurality of blade assemblies carried by the struts. In a preferred embodiment, the annular members are formed of circular I beams and the apparatus is supported for rotation about the axes of the annular members by rollers engaging the web of the I beams. The rollers may be carried by first and second posts with one of the posts being rotatable about the other such that the apparatus can accommodate changing wind directions. The blade assemblies may include an impeller hingedly secured to a cross-beam extending between adjacent struts with each impeller being individually spring biased to present more or less surface to the air current, dependent on its velocity. A gear train, including a roll gear secured to one of the annular members, may be employed as a power takeoff such that the derived rotational motion may be delivered to a location for use.

22 Claims, 8 Drawing Figures

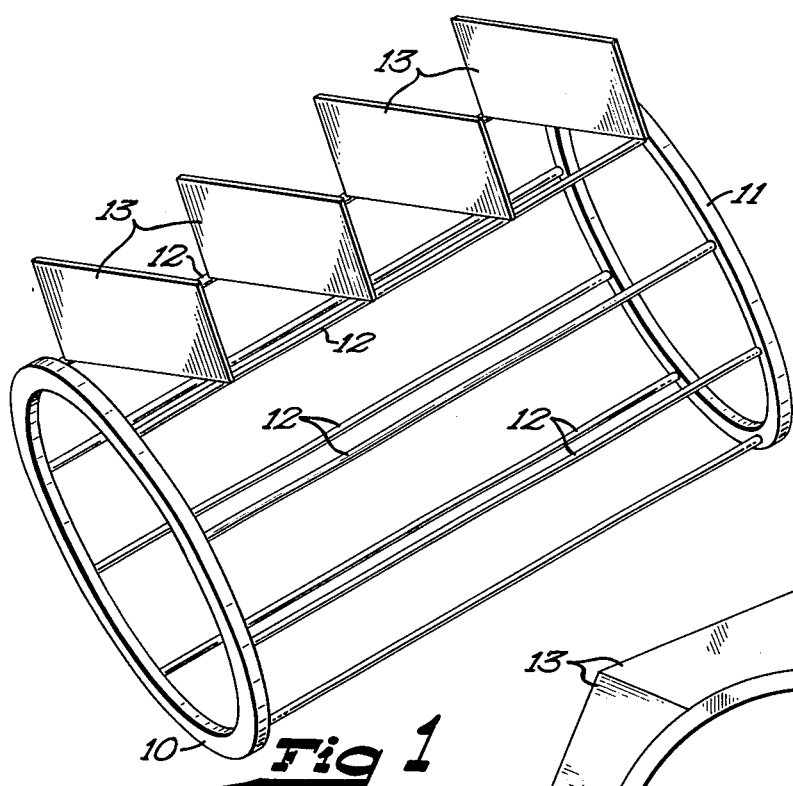
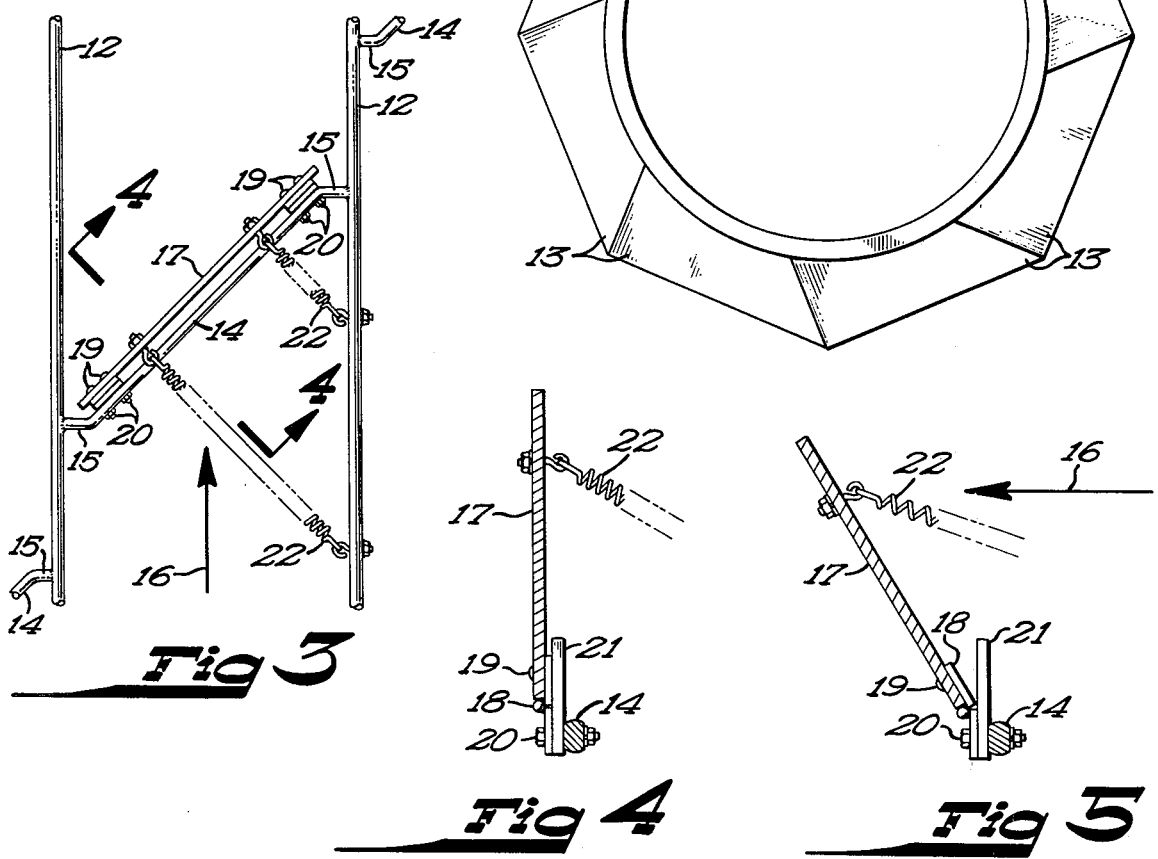

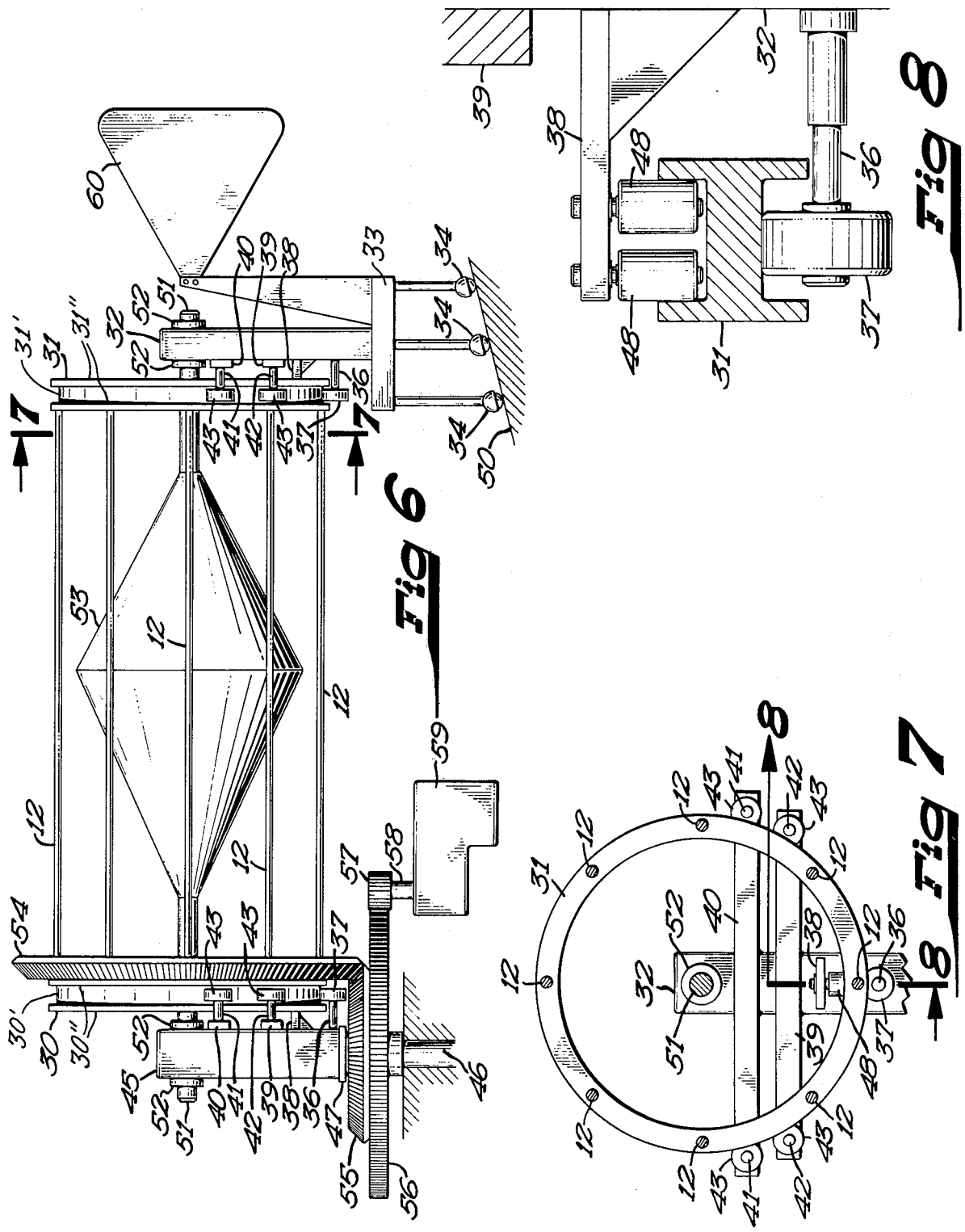

SUPPORT MEANS FOR A WINDMILL

BACKGROUND OF THE INVENTION

Windmills and the like are known to those familiar with the prior art. Such devices have the common feature of presenting impeller structures to air currents for the purpose of deriving a rotational motion therefrom. The rotational motion may be put to several uses such as the generation of electrical energy or the direct powering of a rotary machine, for example, a pump.

Typical prior art windmills have a plurality of blades positioned around a shaft, the blades either being secured directly to the shaft or to radial struts extending from the shaft. To generate great amounts of power, such devices have required complex structures to support the full expanse of the blades and/or radial struts. Also, multiple stage devices of the type described require a duplication of elements for each stage, the radial struts, for example. Further, the use of radial struts has the effect of impeding the very air current from which it is desired to derive power.

SUMMARY OF THE PRESENT INVENTION

The present invention provides apparatus for deriving a rotational motion from air currents which eliminates the complex impeller supporting structures of prior art devices while allowing the apparatus to be constructed in a large size. In addition, the apparatus may be operated in a multiple-stage mode with a mere extension of the structure as opposed to a duplication of that structure for each stage. Also, the radial struts of the prior art devices, and their effect on the air currents through the apparatus, have been eliminated.

The present invention consists essentially of: first and second annular support members coaxial with, and spaced from each other; a plurality of axial struts extending between the annular members; and a plurality of blade assemblies supported by the axial struts. The apparatus of the present invention is supported at the annular members which may be formed of circular I beams, the support being effected by roller means engaging the circular track formed by the I beam web and flanges. The roller means may be carried by posts, one adjacent each of the annular members, with one of the posts being rotatable about the other to accommodate changing wind directions. Also, the blade assemblies may include impellers resiliently urged to a position to present maximum surface area to the air current but deflectable to reduce that surface area on increasing wind velocities. A power takeoff including a roll gear secured to one of the annular members and a gear train driven by the roll gear may be employed to deliver the rotational motion derived from an air current to a location where it may be employed for any useful purpose.

BRIEF DESCRIPTION OF THE DRAWINGS

FIG. 1 is a perspective diagrammatic illustration of major aspects of the present invention.

FIG. 2 is a front view of an assembly constructed in accordance with FIG. 1.

FIG. 3 illustrates a preferred embodiment of a blade assembly forming a part of the present invention.

FIG. 4 is a cross section taken along the line 4—4 in FIG. 3.

FIG. 5 illustrates the operation of the blade assembly of FIG. 2 as viewed along the line 4—4 in FIG. 3.

FIG. 6 illustrates some operational features of a preferred embodiment of the present invention.

FIG. 7 illustrates a cross section taken along the line 7—7 in FIG. 6.

FIG. 8 illustrates a cross section taken along the line 8—8 in FIG. 7.

DETAILED DESCRIPTION OF THE DRAWINGS

FIG. 1 illustrates the cooperation of several major components of the present invention. First and second annular members, 10 and 11, respectively, are spaced from each other with their axes generally coincident. A plurality of struts 12 extend between the coaxial annular members 10 and 11 in the general direction of the axes of the annular members 10 and 11. A plurality of blades or impellers 13 are supported between adjacent ones of the struts 12 and maintained in position in a manner to be described more fully below. While each of the blades 13 illustrated in FIG. 1 extend between the same pair of struts 12, it is to be understood that each of the struts 12 combine to form two distinct strut pairs, one pair each of the next adjacent struts. Each strut pair may function as a blade support it being contemplated that the blades 13 extend around the periphery of the annular members 10 and 11 (see FIG. 2).

Referring now to FIG. 3 there is shown a pair of adjoining struts 12 and the manner in which the blade assembly is secured thereto. A cross-beam 14 extends between a pair of struts 12 forming a generally acute angle therewith. For convenience, cross-beam 14 includes portions 15 which engage the struts 12 generally at a right angle. It is contemplated that the portion 15 will facilitate an attachment between the cross-beam 14 and the struts 12, as by welding. However, the general angular relationship between the cross-beam 14 and struts 12 is non-perpendicular (i.e., the beams 14 form an acute angle with struts 12).

In FIG. 3, the cross-beam 14 forms an angle of approximately 45° with each of the struts 12. Although this angle is not presently believed to be critical, an acute angle between the cross-beam 14 and strut 12 is necessary to impart a rotational movement to the overall assembly as a result of an air current moving in the general direction indicated by the arrow 16. The blade assembly illustrated in FIG. 3 includes a blade or impeller 17 pivotally secured to one plate of a hinge 18, as by bolts 19, for example, with the other plate of hinge 18 being secured to the cross-beam 14, as by bolts 20, for example. A stop 21 cooperates with each of the hinges 18 in a manner to be more fully described below and a plurality of springs 22 resiliently urges the blade or impeller 17 against the stops 21.

Referring now to FIGS. 4 and 5, there is shown a cross section taken along the line 4—4 in FIG. 3 in two operational positions of the impeller 17. In FIG. 4, the springs 22 maintain impeller 17 in position against the stop, this position presenting the maximum surface area to the air current acting on the impeller 17. Optimal operation of the apparatus of the present invention is obtained with a relatively constant rotational speed as opposed to a rapid rotational acceleration and deceleration in the presence of gusting winds. The blade assembly illustrated in FIGS. 3-5 assists this end by allowing each of the impellers 17 to respond independently to gusting winds and reduce the effective surface area presented to such winds. This is illustrated in FIG. 5 wherein the impeller 17 is pivoted away from the stop 21 as would be the case in the instance of a wind gust imparting sufficient force to the impeller 17 to overcome the biasing of the springs 22. Thus, the effective surface area of the impeller 17 presented to the air current (gusting wind) is reduced thus reducing the reaction of the assembly to that air current. Of course, in those instances where the effect of gusting winds is not considered detrimental, or where their occurrence is not likely, the impeller 17 may be rigidly secured directly to the cross-beam 14. FIG. 3 also shows a portion of a second cross-beam 14 extending from each of the struts 12 to illustrate the fact that each of the struts 12 combines to form two strut pairs, one strut pair with the other of the illustrated strut 12 and another strut pair with the next adjoining strut to which the partially illustrated cross-beams 14 extend.

Referring now to FIG. 6 there is shown a system by which a preferred embodiment of the assembly of FIG. 1 may be supported and power delivered to external apparatus. In FIG. 6, the annular members 10 and 11 of FIG. 1 are in the form of circular I beams 30 and 31 each having a web, 30' and 31', and flanges, 30'' and 31'', respectively. Struts 12 extend between the members 30 and 31 in the manner illustrated in FIG. 1. and are adapted to support blade assemblies in the manner described above with references to FIGS. 3-5. For purposes of clarity, the blade assemblies are not illustrated in FIG. 6.

A post 32 is supported on a platform 33, platform 33 being provided with castors 34. A shaft 36 extends from and is supported by the post 32 and carries a weight supporting bearing 37. A plate 38 similarly extends from and is supported by the post 32 for purposes to be described more fully below. Two cross-arms 39 and 40 are supported by the post 32 and themselves support shafts 41 and 42, each of the shafts 41 and 42 carrying balance bearings 43 engaging the web of the circular I beam 31.

A post 45 is positioned over an anchored post 46 for rotational movement relative thereto and may be supported on the post 46 by a bearing 47, for example. Post 45 carries members 36-43 which are fuctionally identical to members of life reference numeral associated with the post 32, with the exception that the members 36-43 associated with the post 45 cooperate with the web of the member 30.

The operation of the members 36-43 are further illustrated in FIGS. 7 and 8. The weight bearing 37 is in engagement with the web of the member 31 and carries the bulk of the weight of the member 31 and those portions of the assembly connected thereto. The balance bearings 43, supported by the cross-arms 39 and 40 and shafts 41 and 42, also engage the web of the member 31 to maintain the member 31 centered over the weight bearing 37. A pair of bearings 48 carried by the plate 38 engage the inner and outer flanges of the member 31 (see FIG. 8) to prevent a movement of the member 31 along its axes. A pair of bearings 48 are also carried by the plate 38 associated with the post 45 for the same function. As illustrated, the bearings 37 and 43 will cooperate to support members 30 and 31 while allowing a rotation about their axes. The details of the bearings 37, 43 and 48 are not shown inasmuch as their selection is within the skill of one familiar with the art as is their support by the posts 32 and 45.

Again referring to FIG. 6, the post 46 is fixed as by imbedding it in the ground. The castors 34 are provided with a track 50 which extends around the shaft 46 such that the platform 33 may pivot around the shaft 46 to accommodate changes in wind direction. Further, the platform 33 may be provided with a vane 60 to automatically accommodate changes in wind direction in a manner known to the prior art. The track 50 may be provided with an upward slope, as illustrated, to assist in overcoming forces exerted on the components of the illustrated assembly by the impingement of air currents.

The posts 32 and 45 may be provided with a shaft 51 extending therebetween generally at the axes of the members 30 and 31. The shaft 51 may be supported within the posts 32 and 45 in any convenient manner, bearings 52 being illustrated. The shaft 51 may be employed to control the distance between the posts 32 and 45 and thus alignment of the bearings 37, 43 and 48 within the circular tracks formed by the webs and flanges of members 30 and 31. Additionally, the shaft 51 may be employed to support a deflecting member 53, the deflecting member 53 serving to direct an air current from the internal portions of the assembly illustrated in FIG. 1 toward the blade assemblies carried by the struts 12. It is presently contemplated that the deflecting member 53 have at least its leading portion conical in shape, the deflecting member 53 not rotating with the members 30 and 31 inasmuch as there is no interconnection between the members 30 and 31 and the shaft 51.

To this point, there has been described a new and novel assembly for deriving a rotational motion from air currents and a preferred embodiment of a supporting system for that assembly. FIG. 6 further illustrates a power takeoff by which that rotational motion may be delivered to an external device for utilization thereby. Specifically, a roll gear 54 is secured to the member 30, the roll gear 54 also being annular so as not to impede the flow of air through the apparatus of the present invention toward deflecting device 53. Roll gear 54 may be secured to the member 30 in any convenient manner and meshes with a match gear 55 secured to the stationary post 46 for rotation around the post 46, in known manner. The match gear 55 is associated with a work gear 56, the work gear 56 rotating with the match gear 55 and meshing with a gear 57. The gear 57 is secured to a shaft 58 of a device 59 to be powered, the device 59 taking any desired form such as an electrical generator or pump, for example. As illustrated, the power takeoff formed of the gear train of gears 54-56 allows the apparatus of the present invention to rotate relative to the stationary shaft 46 while remaining operational to impart a rotational motion to the shaft 58 resulting from a derived rotation of the assembly including members 30 and 31. Of course, when employing the illustrated power takeoff, the impellers 17 will extend radially beyond the roll gear 54, care being taken to position the impellers such that they avoid contact with the work gear 56.

Obviously, many modifications and variations of the present invention are possible in light of the above teachings. For example, any power takeoff having the stated attributes may be employed without departing from the scope of the present invention. Additionally, in some instances it may not be necessary to accommodate changing wind directions. In such instances, two stationary posts may be employed thereby eliminating the rotatable platform 33, the cooperation between the posts 45 and 46 and one of the constraints on the power takeoff system; namely, the necessity of it remaining operational as the assembly of the present invention rotates about the stationary shaft 46. Also, the connection of the several elements to each other may be made in any convenient manner, as by welding, for example. Finally, the annular members between which the struts extend need not have the same diameter. For this reason, the term "axial strut" when used herein is intended to embrace any strut extending between the annular members which does not intersect the axis of the annular members at a point between the annular members. It is therefore to be understood that, within the scope of the appended claims, the invention may be practiced otherwise than as specifically described.

What is claimed is:

1. Apparatus for deriving a rotational motion from air currents which comprises:
   first annular means;
   second annular means spaced from said first annular means;
   strut means extending between said first and second annular means;
   blade assembly means supported by said strut means and comprising cross-beam means extending between adjacent ones of said strut means and impeller means secured to said cross-beam means;
   first support means including means engaging said first annular means while allowing rotation thereof; and
   second support means independent of said first support means and including means engaging said second annular means while allowing rotation thereof.

2. The apparatus of claim 1 wherein said annular means include circular track means, said support means including roller means engaging said circular track means.

3. The apparatus of claim 1 further comprising power take-off means including means carried by said first annular means.

4. The apparatus of claim 3 wherein said power take-off means comprises gear train means, said means carried by said first annular means comprising roll gear means.

5. The apparatus of claim 1 wherein said cross-beam means extend at acute angles between said strut means.

6. The apparatus of claim 5 wherein said impeller means are hingedly secured to said cross-beam means and resiliently urged toward a first position wherein each impeller means is generally perpendicular to a plane defined by the cross-beam means to which it is secured and the strut means between which the cross-beam means to which it is secured extends.

7. The apparatus of claim 5 further comprising:
   hinge means for pivotally securing said impeller means to said cross-beam means;
   stop means fastened to said cross-beam means for preventing pivotal motion of said impeller means past a first position; and
   means for resiliently urging said impeller means toward said first position.

8. The apparatus of claim 1 wherein said annular means comprise circular I beam means including a web, said support means comprising roller means engaging the web of said I beam means.

9. The apparatus of claim 8 wherein said cross-beam means extend at acute angles between said strut means.

10. The apparatus of claim 1 wherein said impeller means are hingedly secured to said cross-beam means and resiliently urged toward a first position wherein each impeller means is generally perpendicular to a plane defined by the cross-beam means to which it is secured and the strut means between which the cross-beam means to which it is secured extends.

11. The apparatus of claim 9 further comprising:
   hinge means for pivotally securing said impeller means to said cross-beam means;
   stop means fastened to said cross-beam means for preventing pivotal motion of said impeller means past a first position; and
   means for resiliently urging said impeller means toward said first position.

12. The apparatus of claim 8 wherein said support means further comprises first and second post means each carrying roller means, the first post means roller means engaging the web of said first annular means and the second post means roller means engaging the web of said second annular means, said second post means being rotatable about said first post means.

13. The apparatus of claim 12 further comprising platform means supporting said second post means, said platform means including castor means for allowing a rotation of said second post means about said first post means.

14. The apparatus of claim 13 further comprising means supported by said first and second post means for deflecting air currents in a direction toward said blades.

15. The apparatus of claim 14 wherein said deflecting means comprises shaft means supported by said first and second post means and deflecting surface means carried by said shaft means.

16. The apparatus of claim 15 wherein at least the leading portion of said deflecting surface means is conical.

17. The apparatus of claim 12 further comprising power take-off means including means carried by said first annular means.

18. The apparatus of claim 17 wherein said power take-off means comprises gear train means, said means carried by said first annular means comprising roll gear means.

19. The apparatus of claim 18 further comprising platform means supporting said second post means, said platform means including castor means for allowing the rotation of said second post means about said first post means.

20. The apparatus of claim 19 further comprising means supported by said first and second post means for deflecting air currents in a direction toward said blades.

21. The apparatus of claim 20 wherein said deflecting means comprises shaft means supported by said first and second post means and deflecting surface means carried by said shaft means.

22. The apparatus of claim 21 wherein at least the leading portion of said deflecting surface means is conical.

* * * * *